United States Patent Office 3,283,208
Patented Nov. 1, 1966

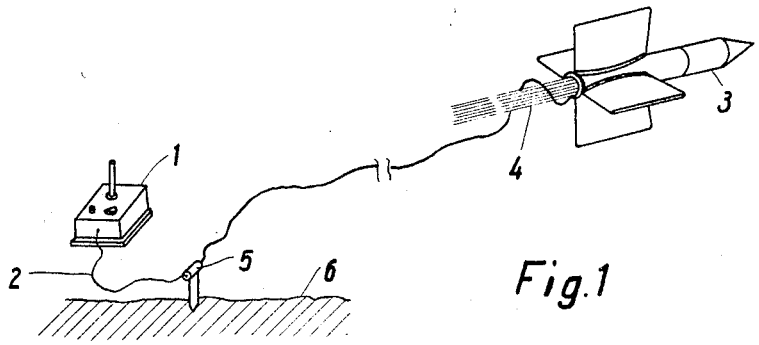
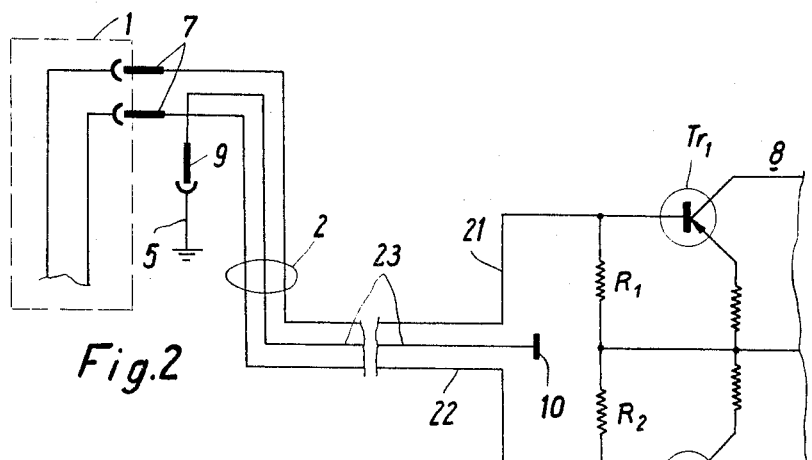
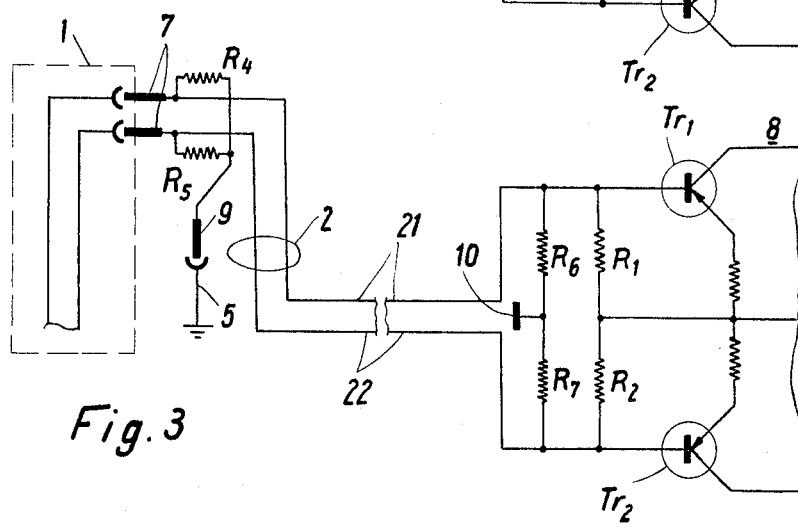

3,283,208
ARRANGEMENT FOR ELIMINATING OR SUPPRESSING INTERFERENCES OF REMOTE CONTROLLED FLYING BODIES
Joachim Hermann, Munich, Germany, assignor to Bolkow Gesellschaft mit beschrankter Haftung, Munich, Germany
Filed Jan. 29, 1963, Ser. No. 254,723
Claims priority, application Germany, Feb. 10, 1962, B 65,887
4 Claims. (Cl. 317—2)

This invention relates to remote controlled flying bodies and, more particularly, to means for suppressing or eliminating interference with the electrical equipment of such flying bodies during flight.

It is known that, during the flight of flying bodies, an electrostatic charge is built up thereon due to atmosperic phenomena. This is particularly true in the case of reaction propelled flying bodies, wherein the hot exhaust jet constitutes an electric probe which transmits the electric potential of the ambient air to the engine body and from there, through metallic connections, to the flying body itself.

The building up of an electrostatic charge or charges on a flying body is a very serious matter, particularly where the flying body contains receiving equipment for receiving guiding signals for controlling the flying body. This is even more serious in the case where the input of such receivers is current sensitive, as where the receiving circuits are transistorized. When the difference between the potential of the electrostatically charged flying body and the potential of its receiver input exceeds an amount determined by the break-down value of the insulation, a flashover occurs between the flying body and the receiver input.

As a result of this break-down of the insulation, or flashover, the electrostatic charge built up on the flying body can intermittently or continuously discharge through the electric bridge or shunt resulting from the breakdown or flashover. Consequently, there is substantial interference with the guiding signals at the input of the receiver and, in some instances, these signals cannot be received. In such circumstances, the flying body is no longer under control as to its course, and can depart from the desired trajectory or flying path. Even more serious is the fact that it cannot be returned to its original trajectory by means of guiding signals.

The foregoing conditions are particularly applicable to that type of flying bodies which have guiding signals transmitted thereto during flight from a control or guiding station, with the signals being transmitted to the flying body over a solid wire connection, since such a solid wire connection customarily is connected with the control or guiding station, and thus with the ground. With a relatively low resistance to ground, the wire connection maintains the receiver circuit of the flying body at approximately ground potential. This enhances the danger of the aforementioned flashover due to the build up of an electrostatic charge on the flying body.

In the case of unguided or free flying bodies, it is known to use "radiation points" for discharging electrostatic charges. These radiation points, however, are merely for the purpose of effecting a uniform distribution of the electrostatic charge on the flying body. Experience has shown that they are not effective to eliminate a potential difference beween a flying body and the input of a receiver for guiding signals.

In the art of transmitting electrical energy, so-called "discharge horns" are known and these compensate directly for change differences caused by atmospheric interference. Devices of this type, however, are connected directly to ground and are not movable through the air as in the case of a flying body.

An object of the present invention is to overcome this disadvantage of guided flying bodies. In accordance with the invention, therefore, the flying body is provided with a ground connection during the entire period of its flight, and this ground connection is used for discharging or dissipating the electrostatic charges. Preferably the grounding connection comprises a metallic conductor included within a cable which is used to transmit the guiding signals to the flying body.

In accordance with a preferred embodiment of the invention, the two-conductor cable for transmitting the guiding signals from the control station to the flying body is bridged both at the output of the control station and at the input of the receiver of the flying body, this bridging being effected by two resistances of equal magnitude. The common junction of the first pair of resistances is connected to ground, while the common junction of the second pair of resistances, which latter are located in the flying body, is so connected to the flying body that the electrostatic charge accumulated thereon is continually drawn off.

For an understanding of the principles of the invention, reference is made to the following description of a typical embodiment thereof as illustrated in the accompanying drawings.

In the drawings:

FIG. 1 is a perspective view of a flying body which is continuously connected to a control or guiding station by metallic conductors;

FIG. 2 is a schematic wiring diagram of one arrangement, in accordance with the invention, for dissipating the electrostatic charge accumulated on a remote controlled flying body; and FIG. 3 is a schematic wiring diagram of another embodiment of such means.

The control or guiding station 1 schematically or diagrammatically illustrated in FIG. 1 generates guiding or control signals in a known manner. These control signals are transmitted over a solid metal transmission line 2 to a remote controlled flying body 3 which is reaction driven by means of a gas jet 4. The line or cable 2 is wound on a spool or reel (not shown) within the flying body 3 so that it may be unwound from its spool or reel during flight. In order to avoid the reaction forces due to such unwinding being transmitted to control station 1, there is provided an anchor member or grounding member 5 which is anchored in the ground 6 as schematically illustrated.

In order to facilitate handling, cable 2 is connected to control station 1 by means of a plug connection 7, as will be seen from FIGS. 2 and 3. To receive the guiding or control signals generated at control station 1 and transmitted over cable 2 to flying body 3, the latter is provided with a receiver 8.

In FIG. 2, only the transistors $Tr1$ and $Tr2$ of receiver 8 are illustrated. These transistors are biased from the potential network of the flying body through base resistances $R1$ and $R2$ in a desired manner. The guiding or control signals which, for example, may be in the form of rectangular pulses of positive and negative polarity, are applied to the bases of transistors $Tr1$ and $Tr2$ through conductors 21 and 22 included in the cable 2.

In dependence upon the respective bias potentials, which are determined by the base resistances $R1$ and $R2$, transistors $Tr1$ and $Tr2$ are made selectively conductive by the positive or negative pulses, alternately or jointly, so that current flow can take place in the individual circuits of receiver 8 in a manner to actuate the guiding means of the flying body.

In accordance with the invention, the electrostatic charges which are accumulated during flight of the body 3, and which may be discharged to the receiver input if there is a sufficiently high potential build up of the charges, are discharged to ground. In the arrangement of FIG. 2, an additional conductor 23 is provided within the cable 2. Conductor 23 is connected with the mass of the flying body, as schematically illustrated in FIG. 3, or with the mass of the engine 10. The ground end of conductor 23 is provided with a plug connection 9 for engagement with the anchor or grounding means 5.

In the embodiment of the invention shown in FIG. 3, station 1 is again connected through a plug connection 7 with cable 2 comprising conductors 21 and 22, the conductors 21 and 22 being connected to the input of the receiver 8 in the same manner as previously described. As in FIG. 2, only the transistors $Tr1$ and $Tr2$ with their base resistances $R1$ and $R2$ are illustrated. In the embodiment of FIG. 3, however, the mass 10 of the flying body is grounded by a so-called balanced circuit or "superimposed circuit."

The balanced circuit comprises two series-connected resistances $R4$ and $R5$, which are connected across the output of station 1, as well as two series-connected resistances $R6$ and $R7$ which are connected across the input of the receiver. The common junction of resistances $R4$ and $R5$ is grounded at 9–5, and the common junction of resistances $R6$ and $R7$ is connected to the mass 10 of the flying body or its engine. By virtue of these connections, a balanced superimposed grounding circuit is formed, as will be understood readily by those skilled in the art.

Advantageously, resistances $R4$–$R7$ are of equal value and have a sufficiently high resistance that they do not effect any decrease in the guiding signal potential. In a practical example, the value of the resistance $R4$–$R7$ may be 100 KΩ, while the base resistances $R1$ and $R2$ may have a value of 2 KΩ each.

In some instances, it may be advantageous for the resistances $R4$–$R7$ to be non-linear resistances in order to prevent the development of high voltages at the flying body with a high flow of static electricity. In such case, the non-linearity of the resistances should be voltage dependent such as, for example, VDR resistances.

While specific embodiments of the invention have been shown and described in detail to illustrate the application of the principles of the invention, it will be understood that the invention may be embodied otherwise without departing from such principles.

What is claimed is:

1. In a jet propelled flying body, having an ionized hot exhaust gas jet acting as an electric probe moving through the air and exchanging electrostatic charges with the air whereby the flying body is continuously highly charged, said missile being guided by signal pulses received over a metallic circuit from a guiding station having a pulse source, and carrying a signal receiver including a pair of input transistors having base resistances which form, with a two-wire metallic circuit between the receiver input and the output of the pulse source, a direct current signal transmission circuit symmetrical with the pulse source: means for dissipating accumulated electrostatic charges from the flying body, to prevent interference with the guiding signal pulses, comprising, in combination, a first pair of series-connected resistances bridging the two metallic conductors of the signal transmission circuit at the output of the guiding station; a second pair of series-connected resistances bridging the two metallic conductors of the signal transmission circuit at the input of the signal receiver; the four bridging resistances being substantially equal in ohmic value; means connecting the common junction of the resistances of said first pair to ground at the guiding station; and means connecting the common junction of the resistances of said second pair to the mass of the flying body; whereby said first and second pairs of resistances form a superimposed balanced bridging circuit for dissipating accumulated electrostatic charges from the flying body to the guiding station.

2. Means for dissipating accumulated electrostatic charges from a flying body, as claimed in claim 1, in which the ohmic value of each of the bridging resistances is a large multiple of the ohmic value of the base resistances of the transistors.

3. Means for dissipating accumulated electrostatic charges from a flying body, as claimed in claim 1, in which the ohmic value of each of the bridging resistances is of the order of 100 kilo-ohms.

4. Means for dissipating accumulated electrostatic charges from a remote controlled flying body, as claimed in claim 1, in which the bridging resistances are non-linear resistances.

References Cited by the Examiner

UNITED STATES PATENTS

| | | | |
|---|---|---|---|
| 287,288 | 10/1883 | Jacob | 179—15 X |
| 1,284,982 | 10/1918 | Balsillie | 317—4 X |
| 1,900,283 | 3/1933 | Hammond | 325—377 |
| 2,293,918 | 8/1942 | Planiol | 317—2 |
| 2,502,496 | 4/1950 | Wickman | 317—2 X |
| 2,554,598 | 5/1951 | Storch | 317—18 |
| 2,791,728 | 5/1957 | Traygott | 317—17 |
| 3,149,568 | 9/1964 | Gerber | 244—14 X |
| 3,156,185 | 10/1964 | Hermann | 244—14 |
| 3,163,711 | 12/1964 | Schindler | 244—14 X |

MILTON O. HIRSHFIELD, *Primary Examiner.*

SAMUEL BERNSTEIN, STEPHEN W. CAPELLI,
*Examiners.*

J. A. SILVERMAN, *Assistant Examiner.*